: 2,698,806
Patented Jan. 4, 1955

2,698,806

SELF-EXTINGUISHING COMPOSITION OF CELLULOSE ACETATE AND BENZENE HEXACHLORIDE

William P. ter Horst, Lewiston, N. Y., assignor to Olin Mathieson Chemical Corporation, a corporation of Virginia No Drawing. Application December 28, 1951,
Serial No. 263,969

6 Claims. (Cl. 106—15)

My invention relates to the production of cellulose acetate plastics and more specifically relates to cellulose acetate compositions containing benzene hexachloride as an extender and to the incorporation of low cost insecticidally inactive isomeric mixtures of benzene hexachloride in such plastic compositions.

The acetic acid esters of cellulose are water insoluble plastics or resins which in general contain from about 30 per cent to 62½ per cent by weight of combined acetic acid, depending upon the degree of hydrolysis. The more common commercially available cellulose acetates contain from about 52 to 61 per cent of combined acetic acid. These resins are noted for their brilliance, transparency, freedom from color, their low specific gravity, excellent electrical properties, resistance to water, chemicals and weather. In addition they are easily formed into fibers, films and molded articles.

I have discovered that benzene hexachloride, 1,2,3,4,5,6-hexachlorocyclohexane, is compatible with cellulose acetate in high proportions and may be beneficially incorporated in any desired amount, from a low proportion, say about 1 percent by weight up to about 25 percent, or somewhat more with particular plastics, by weight of the composition. I have found that in these proportions benzene hexachloride is a valuable extender for reducing the cost of the plastic compositions without deleteriously affecting their desirable properties. Thus the range of potential commercial usefulness of cellulose acetate plastics is greatly expanded. I have also found that the incorporation of about 10 weight per cent of benzene hexachloride materially reduces flammability while upwards of about 15 weight per cent produces self-extinguishing compositions. Thus where the usual commercial cellulose acetate products ignite readily and continue to burn until they are substantially completely consumed, the modified cellulose acetate compositions of my invention do not burn but are self-extinguishing once the source of ignition is removed.

In the modified cellulose acetate compositions of my invention, the benzene hexachloride extender is substantially non-volatile, is stable under the usual conditions of use, and is apparently free from any noticeable evolution of hydrogen chloride or other decomposition product. The modified compositions are satisfactorily flexible, transparent and are otherwise suitable for the purposes for which cellulose acetate films are commercially used, including the production of photographic film.

The new compositions of my invention comprise cellulose acetate compositions which contain as an essential modifying or extending ingredient benzene hexachloride in proportions from about 1 weight per cent on the composition up to the limit of compatibility. The limit of compatibility is somewhat variable depending upon the composition or nature of the particular cellulose acetate product and the mode of incorporation but is of the order of about 25 to 30 weight per cent. The variability in compatibility may be illustrated by comparison with the compatibility of benzene hexachloride in cellulose acetate butyrate and ethyl cellulose which is of the order of only 5 weight per cent maximum. Most beneficially, the new compositions of my invention contain the benzene hexachloride ingredient in the form of a substantially insecticidally inactive fraction such as a mixture of the alpha-beta isomers in proportions of about 10 to 25 weight per cent.

Although any of the isomers of benzene hexachloride are suitable for use according to the present invention, the insecticidally inactive materials are preferred. Such fractions are usually separated from the insecticidally active fractions of benzene hexachloride during manufacture in order to produce so-called gamma concentrates or pure gamma isomer (Lindane). The latter products command a much higher price as insecticides than can make them desirable extenders of plastics. Thus it is not generally feasible to utilize them for the present purpose. In addition it is preferable to utilize as extenders, fractions of benzene hexachloride which have been subjected to solvent treatment, e. g., extraction or crystallization, since these operations remove the more odoriferous components of crude benzene hexachloride and yield a by-product fraction having little or no odor. These residual inactive fractions usually consist largely of the alpha and beta isomers together with small proportions of gamma, delta and possibly other isomers inevitably formed during the manufacture of benzene hexachloride. A typical composition consists of 89% alpha, 8% beta and 3% of other mixed isomers. Hence, the use of the insecticidally inactive fractions as plasticizers for cellulose acetate is an especially advantageous aspect of the present invention. Because of the high demand for gamma concentrates and Lindane, large supplies of alpha and beta isomers are cheaply available at waste by-product prices. This makes the use of alpha-beta mixtures especially advantageous in extending supplies of cellulose acetate and in materially reducing their cost.

In producing the cellulose acetate compositions of my invention, the benzene hexachoride extender may be incorporated by milling into the plastic, by solution in a common solvent, particularly for film casting or spinning, or by other conventional means. In milling, temperatures of 165 to 185° C. may be used but at the higher temperatures, short times are preferred. Fillers, pigments, dyes, stabilizers and the like; e. g. titania and acetate dyes, may be incorporated in the usual manner for the usual purposes.

Means for preparing samples of the new compositions and the physical properties of the compositions are illustrated in the following examples, which however are not intended to be limited to the details of procedure or formulation described.

*Example I*

Acetone solutions were prepared containing 20 per cent of cellulose acetate and 20 and 25 per cent of alpha, beta-benzene hexachloride based on the cellulose acetate contents. The cellulose acetate contained 55–56 per cent by weight of combined acetic acid and was of the viscosity grade commonly known as "40 seconds." The acetone solutions containing benzene hexachloride had viscosities of about 8000 centipoises determined with a Brookfield viscosimeter.

Films were laid down by evaporation of the solution poured on glass plates. After air drying and seasoning in a vacuum oven at 40° C. overnight all the films were clear, showing the compatibility of the the extender. The films were 0.008 to 0.009 inches thick. The film containing no benzene hexacholride showed a tensile strength of 11,500 p. s. i. and an elongation of 32%. The film containing 25 per cent benzene hexachloride had a tensile strength of 14,000 p. s. i. and an elongation of 23 per cent.

The films, together with an untreated cellulose acetate film similarly prepared, were hung vertically from a clamp and a drop of benzene was placed on the lower tip of each. When ignited, the untreated film burned completely but the film containing 25 per cent of benzene hexachloride did not. The flame went out as soon as the benzene was consumed. The film containing 20 per cent benzene hexachloride stopped burning shortly after the benzene was consumed.

*Example II*

An acetone solution was prepared containing 20 parts of the same cellulose acetate used in Example I and 3.5 parts of alpha, beta-benzene hexachloride in 80 parts of a solvent comprising 80 per cent acetone and 20 per cent ethanol. A film was laid down by evaporation of the solution poured on a glass plate. After drying overnight in a vacuum oven at 60° C., the film was clear, showing the compatibility of the extender. Films of the same thickness as in Example I showed, for the benzene hexachloride-free film tensile strength of 12,400 p. s. i. and elongation of 20 per cent, and for the film containing 15 per cent benzene hexachloride a tensile strength of 12,000 p. s. i. and an elongation of 17 per cent.

The film together with an untreated cellulose acetate film similarly prepared, was hung vertically from a clamp and a drop of benzene was placed on the lower tip of each. When ignited, the untreated film burned completely but the film containing 15 per cent of alpha, beta-benzene hexachloride did not. The flame went out as soon as the benzene was consumed.

*Example III*

A solution of 30 parts of cellulose acetate similar to that used in the preceding examples and containing 55.5–56.2 per cent of combined acetic acid, 12.9 parts of alpha, beta-benzene hexachloride and 70 parts of acetone was spun from a bath at about 60° C. by using a nitrogen pressure of 40 p. s. i. g. to force the solution through a 0.014" diameter orifice. The extruded solution was dried to a fiber by downward passage through an air chamber maintained at 100° C. near the top and at 80° C. near the bottom. The fiber was then dried at 60° C. in a vacuum oven for 48 hours. A transparent, highly lustrous continuous filament was formed. It had a toughness and freedom from brittleness equivalent to that of an unmodified cellulose acetate fiber similarly prepared. This fiber contained 30 per cent of alpha, beta-benzene hexachloride and was self-extinguishing in contrast to the unmodified fiber which burned readily and completely.

*Example IV*

A film was prepared from the same acetate used in Example I. The dope comprised 100 parts of the cellulose acetate, 15 parts of alpha, beta-benzene hexachloride, 20 parts of tricresyl phosphate, 320 parts of acetone and 80 parts of ethanol by weight. Films were cast on glass and air dried at room temperature for about one week before testing. The treated film stopped burning immediately when removed from the flame but untreated films burned completely.

*Example V*

A dope was made from 100 parts by weight of cellulose acetate, 15 parts of alpha, beta-cake (mixed alpha, beta-benzene hexachloride obtained as a waste by-product filter cake in gamma-benzene hexachloride concentration by solvent extraction and crystallization), 20 parts of diethyl phthalate and 400 parts of a solvent comprising 80 per cent acetone and 20 percent ethanol. The films were cast and dried as in the preceding examples and were clear and tough. The alpha, beta-cake was thus entirely compatible.

*Example VI*

A mixture of 100 parts of the cellulose acetate containing 54–56 percent of combined acetic acid, 15 parts of alpha, beta-cake and 20 parts of diethyl phthalate was rolled for 15 minutes using temperatures of 385° F. on the front roll and 330° F. on the back roll. The sheets were allowed to cool and ground to obtain a molding powder. The composition was injection molded into 2" diameter discs using a cylinder temperature of 350°–375° F., a pressure of 1000 p. s. i. and a mold temperature of 95° C. There was no separation or crystallization from the molded disc. The composition burned when held in a Bunsen flame but when removed extinguished itself.

For comparison, a similar composition was prepared under substantially the same conditions but omitting the alpha, beta-cake. The molded disc ignited readily in a Bunsen flame. The combustion increased and continued on removal from the flame until the disc was completely consumed.

I claim:
1. A composition of matter which consists essentially of cellulose acetate and from about 1 weight per cent to the limit of compatibility of benzene hexachloride.
2. The composition of claim 1 in which the benzene hexachloride comprises a substantially insecticidally inactive benzene hexachloride fraction.
3. The composition of claim 1 in which the benzene hexachloride comprises a mixture of the alpha and beta isomers.
4. A composition of matter which consists essentially of cellulose acetate and from about 10 weight per cent to about 25 weight per cent of benzene hexachloride.
5. The composition of claim 4 in which the benzene hexachloride comprises a substantially insecticidally inactive benzene hexachloride fraction.
6. The composition of claim 4 in which the benzene hexachloride comprises a mixture of the alpha and beta isomers.

No references cited.